(12) United States Patent
Dieffenderfer et al.

(10) Patent No.: US 7,319,578 B2
(45) Date of Patent: Jan. 15, 2008

(54) DIGITAL POWER MONITOR AND ADAPTIVE SELF-TUNING POWER MANAGEMENT

(75) Inventors: James N. Dieffenderfer, Apex, NC (US); Praveen Karandikar, Cary, NC (US); Michael B. Mitchell, Fuquay-Varina, NC (US); Thomas P. Speier, Holly Springs, NC (US); Paul M. Steinmetz, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 11/148,090

(22) Filed: Jun. 8, 2005

(65) Prior Publication Data
US 2006/0279891 A1    Dec. 14, 2006

(51) Int. Cl.
*H02H 5/04* (2006.01)
(52) U.S. Cl. ...................................... 361/103
(58) Field of Classification Search ................ 361/103; 327/544, 534
See application file for complete search history.

(56) References Cited

U.S. PATENT DOCUMENTS

| | | | |
|---|---|---|---|
| 3,843,876 A | 10/1974 | Fette et al. | 235/175 |
| 4,740,906 A | 4/1988 | Renner et al. | 364/724 |
| 4,918,642 A | 4/1990 | Chang | 364/787 |
| 5,548,209 A | 8/1996 | Lusignan et al. | 324/142 |
| 5,692,160 A | 11/1997 | Sarin | 395/500 |
| 6,000,036 A * | 12/1999 | Durham et al. | 713/320 |
| 6,434,135 B1 | 8/2002 | Ozluturk et al. | 370/342 |
| 6,499,811 B2 | 12/2002 | Kumabe et al. | 303/20 |
| 6,535,056 B2 * | 3/2003 | Mizuno | 327/544 |
| 2002/0130712 A1 | 9/2002 | Naffziger et al. | 327/544 |
| 2003/0001605 A1 | 1/2003 | Jones et al. | 324/760 |
| 2003/0065459 A1 | 4/2003 | Huber et al. | 702/62 |

* cited by examiner

*Primary Examiner*—Michael Sherry
*Assistant Examiner*—Lucy Thomas
(74) *Attorney, Agent, or Firm*—Joscelyn G. Cockburn; William N. Hogg; Driggs, Hogg & Fry Co., LPA

(57) ABSTRACT

A method and apparatus are provided for determining power events on an I/C chip for undissipated power to the chip, and wherein the chip includes a plurality of separately regulatable power consumers. A structure is provided for monitoring the occurrence of each power event to each power consumer, and determining the dissipation of power from each power event, and controlling power used by the chip responsive to the amount of undissipated power.

15 Claims, 1 Drawing Sheet

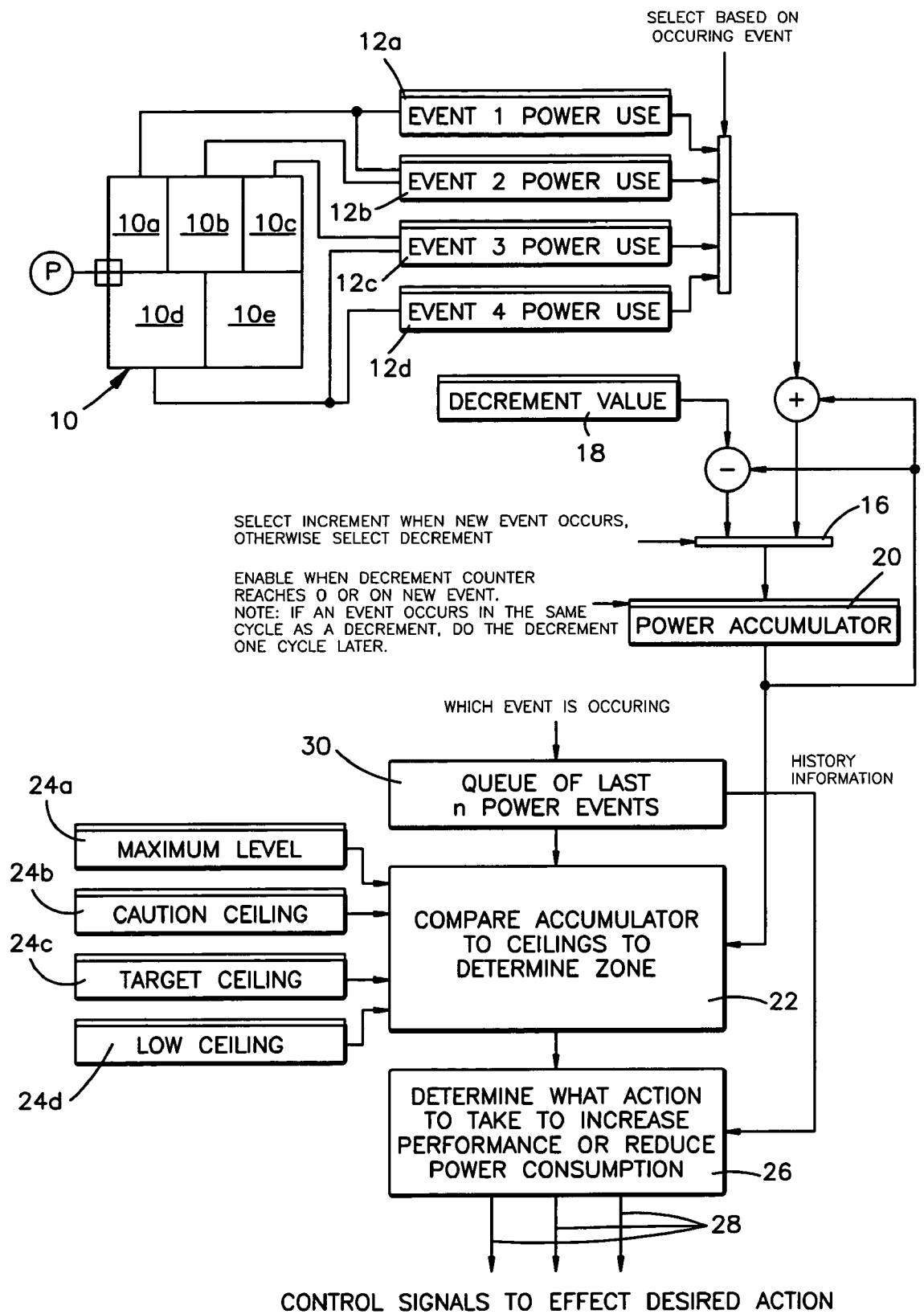

DIGITAL POWER MONITOR AND ADAPTIVE SELF-TUNING POWER MANAGEMENT

FIELD OF THE INVENTION

This invention relates to a method and device for managing power used by a hardware device based on the operations performed by the device over a given period of time and, more particularly, to controlling the power used by a device to prevent over heating of the device.

BACKGROUND OF THE INVENTION

In many devices, including I/C chips, it is well known that excess or over heating may occur from uneven power distribution, possibly resulting in damage to the device. While heating of a device may be monitored by one or more thermocouples, this is slow in response, and does not always measure the heat at local "hot spots". Thus, it is desirable to substantially continuously determine the heat at a device to provide means to prevent over heating and, thus, minimize damage to the device.

SUMMARY OF THE INVENTION

A method and apparatus for determining power events on a power consuming device, especially an I/C chip, for undissipated power to the device and control power delivered to the device responsive to the power dissipation from the device, and wherein the device includes a plurality of separately regulatable and supplied power consumers, comprising a structure for and the steps of: monitoring the occurrence and amount of each power event to each power consumer; determining the dissipation of power from each power event; and controlling power to said chip responsive to the amount of undissipated power.

BRIEF DESCRIPTION OF THE DRAWINGS

The single FIGURE is a schematic representation of the monitoring and control of power to a device according to the present invention.

DETAILED DESCRIPTION OF THE PREFERRED EMBODIMENT(S)

The present invention will be described in conjunction with its use on an I/C chip 10, which constitutes a preferred use of the invention. Basically, the chip 10 has a plurality of individually powered areas 10a-10e such as, including but not limited to, arrays, arithmetic units, instruction processing, etc. Logic is used to count the number count and record power events to at least some of the powered areas. This is preferably done using a power accumulator to track power used by the chip and not yet dissipated. This will allow power to be consumed in regulated amounts by various sections of the chip to maintain a selected temperature value at the chip.

This method has several advantages over using a chip thermistor coupled with an analog-to-digital converter:

1. Provides specific measurement for logic block being monitored which allows precise power management
2. Does not significantly increase design complexity.

The activation of this power monitoring logic does consume power; however, its use is justified for the following reasons:

1. The power consumed by this logic is a small fraction of the total power.
2. This logic could be used to characterize and tune a product during development via software or hardware and disabled in the final product. It is not unusual to have logic which is solely used during development. Examples of this would be debug, trace and performance monitors.

Power Accumulator

In one embodiment of the present invention, a power accumulator 20, having separate event monitors 12a, 12b, 12c and 12d are connected, respectively, to sections 10a, 10b, 10c and 10d of the chip 10 to monitor power from a power source P consumed by each section. The value of the power events from each monitor is delivered to a switch 16 where the event and its value are delivered to an incrementor/decrementor 18 attached to a power accumulator 20. The power accumulator 20 is attached to a compare accumulator 22 which, in turn, is attached to a ceiling regulator 24. In the disclosed embodiment, the ceiling regulator 24 is comprised of four levels; maximum level 24a, caution ceiling 24b, target ceiling 24c and low ceiling 24d. The dissipation rate is used to model power (heat) dissipation. It is used to model the average power used per cycle. This is accomplished by running power simulation to determine the appropriate values. These values would then be provided to the end user.

The following is an example of the behavior that the accumulator is trying to model. A designer may only want a part to use five units a cycle. However, it may use 15 units in a give cycle, but only every three cycles. So, on average, it uses five units a cycle. Ideally, values would be chosen to keep the accumulator 20 at an average value of five.

Power Dissipation and Response

In response to the various ceilings that are set by the ceiling regulator 24, various actions are taken by the chip, i.e. to increase performance of the chip 10 or reduce the power consumption. The ceilings are set by experience of the user and can be easily determined by a few known experiments, such as performance/power testing. Four ranges were chosen, but the invention is not constrained by the number of ranges. The ranges chosen have the following characteristics:

Target: This range represents when the managed logic is using the "ideal" amount of power. The ideal power usage is the region in which the minimum amount of power is used to accomplish the function at the performance required. The hardware will take no action to alter the mode of operation of the monitored logic while in this range.

Low: This range represents when the managed logic is operating below the target range. In this range, the hardware will take action to improve performance at the expense of power. Note that the logic may be in this range because no operations are taking place. In this case, the power management logic will not actively try to improve performance.

Caution: This range represents when the managed logic is using more power than desirable. In this range, the hardware will take action to reduce power consumption by sacrificing performance. The goal is to return to the target range.

High: This range represents when the managed logic is using such a high level of power that the operation of the part is at risk. For instance, in this range, the device may be in danger of overheating or draining a battery too quickly. In this range, the hardware will disable the managed logic until the power has been dissipated to a safe level.

The user has the ability via the hardware to enable various actions to be taken when entering, leaving, or remaining in a range. Examples of actions for an L2 cache are taking an exception, serializing array access, or delayed array requests. Each logic block that can influence power usage can have its actions configured individually.

An advantage of this method is that a target power consumption can be achieved by only impacting the performance of the operations that use the most power. This allows all other operations to achieve maximum performance.

The power accumulator is used to keep track of the amount of power used and not yet dissipated. Different power events may consume different amounts of power. Therefore, the number of units of power used by a given power event is configurable in the hardware on a per event basis. A unit of power does not necessarily correspond to power measurement units, such as Watts. The power dissipation value (number of units of power) and dissipation interval are also configurable in the hardware. The combination of the power dissipation value and interval yield a power dissipation rate. When a power event occurs, the accumulator increments by the configured value for that power event. After the configured dissipation interval has elapsed, the accumulator is decremented by the configured dissipation value.

For example, in an L2 cache that contains multiple physical arrays, array accesses to each physical array would be an individual power event. Suppose the power usage value were set to five units for a single array access, the dissipation value set to one unit, and the dissipation interval set to two cycles. After an array request in which two physical arrays were activated, the accumulator would increment by 10 units. Two cycles later, the accumulator would be reduced by one unit. After two more cycles, the accumulator would again decrement by another one unit. These increments and decrements continue over the operation of the part.

Power Event History

The power event history is used to track the types of power events that have occurred in a given window of time. The history can be used to track both the power event source and the power event type. Each time a power event source activates the monitored logic, an entry for that event is recorded.

One method of tracking power event history is to maintain a FIFO Queue 30 of power events. As a power event occurs, it is added to the head of the queue. By examining the queue, it is possible to determine which events have most recently contributed to power usage. This method provides a sliding window of power usage.

Another way to implement power history is to maintain a table of all types of power events. Each entry in the table would contain a counter which is incremented each time that power event occurs. By examining the table, it is possible to determine the portion of total power usage induced by each type of event. This method can be used to characterize the power profile for software modules within a given application.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. Apparatus for determining power events on an I/C chip for undissipated power to the chip having different components performing different functions at different locations on said chip, comprising said chip including a plurality of separately supplied and regulatable power consumers connected to different locations, wherein each power supplied constitutes a power event;
   a structure for monitoring the occurrence and amount of power for each power event;
   a structure for determining the dissipation of power from each power event operatively connected to each said monitoring structure; and
   a structure to control power at a given power level above zero used by said chip for each power event at said apparatus responsive to the amount of undissipated power;
   wherein the structure to control power at a given power level above zero used by the chip includes a structure to control power used at a plurality of operating levels individually at each monitoring structure.

2. The invention as defined in claim 1 wherein said structure to control power used by said chip includes a structure to control power used by at least one individual power consumer.

3. The invention as defined in claim 1 wherein said structure for determining the dissipation of power includes at least one counter.

4. The invention as defined in claim 1 wherein an additional level of control of power is to shut off operations in the chip completely.

5. The invention as defined in claim 1 wherein one level of power control is to reduce power used by at least one power consumer on said chip.

6. The invention as defined in claim 1 wherein a structure is provided to restore operations when the undissipated power reaches a given level.

7. The invention as defined in claim 1 wherein a structure is provided for a record of each power event.

8. The invention as defined in claim 1 wherein programming is provided to select the various levels of power controlled.

9. A method for determining power events on an I/C chip for undissipated power to a chip having different components performing different functions at different locations on said chip, and wherein the chip includes a plurality of separately supplied and regulatable power consumers connected to different locations, wherein each power supplied constitutes a power event, comprising the steps of:
   monitoring the occurrence and amount of power for each power event to each power consumer;
   determining the dissipation of power from each power event; and
   controlling power at a given power level above zero to said chip for each power event at said apparatus responsive to the amount of undissipated power
   wherein the power at a given power level above zero used by said chip is controlled individually to a plurality of operating levels to each consumer.

10. The invention as defined in claim 9 wherein at least one counter is provided to determine power dissipation.

11. The invention as defined in claim 9 wherein an additional level of control of power is to shut off operations in the chip completely.

12. The invention as defined in claim 9 wherein one level of power control is to reduce operations in at least one power consumer on said chip.

13. The invention as defined in claim 9 wherein operations are restored when the undissipated power reaches a given level.

14. The invention as defined in claim 9 wherein a record of each power event is maintained.

15. The invention as defined in claim 9 wherein programming is provided to select the various levels of power controlled.

* * * * *